United States Patent
Bühring (12)

(10) Patent No.: US 6,209,674 B1
(45) Date of Patent: Apr. 3, 2001

(54) ARRANGEMENT FOR CONTROLLING PREDETERMINED FUNCTION VIA A DATA BUS

(75) Inventor: Peter Bühring, Hamburg (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/412,260

(22) Filed: Oct. 5, 1999

(30) Foreign Application Priority Data

Oct. 8, 1998 (DE) .............................................. 198 46 350

(51) Int. Cl.⁷ ............................ B60K 28/14; B60R 21/32
(52) U.S. Cl. ........................... 180/282; 280/735; 701/45; 307/10.1; 340/436
(58) Field of Search .................................. 180/271, 282; 280/735; 701/45; 340/436, 438; 307/10.1

(56) References Cited

U.S. PATENT DOCUMENTS

| | | | |
|---|---|---|---|
| 5,718,452 | * 2/1998 | Vogt | 280/735 |
| 5,760,489 | * 6/1998 | Davis et al. | 307/10.1 |
| 5,964,816 | * 10/1999 | Kincaid | 701/45 |
| 6,070,114 | * 5/2000 | Fendt et al. | 701/45 |
| 6,097,761 | * 8/2000 | Buhring et al. | 375/257 |

FOREIGN PATENT DOCUMENTS 196 16 293    4/1996   (DE) .

* cited by examiner

Primary Examiner—Paul N. Dickson
(74) Attorney, Agent, or Firm—Steven R. Biren

(57) ABSTRACT

An arrangement for controlling at least one predetermined function, which can be transmitted from at least one transmission apparatus (1) to a receiving apparatus (11) via a serial data bus, is protected against unintentional triggering of the predetermined function in that in order to control a predetermined function the transmission apparatus (1) dispatches an associated, predetermined data message on the serial data bus (7) and adjusts a transmission parameter of the data bus to a predetermined value, and in that the receiving apparatus (11) triggers the predetermined function only if the predetermined data message appears on the data bus (7) with the predetermined transmission parameter.

10 Claims, 1 Drawing Sheet

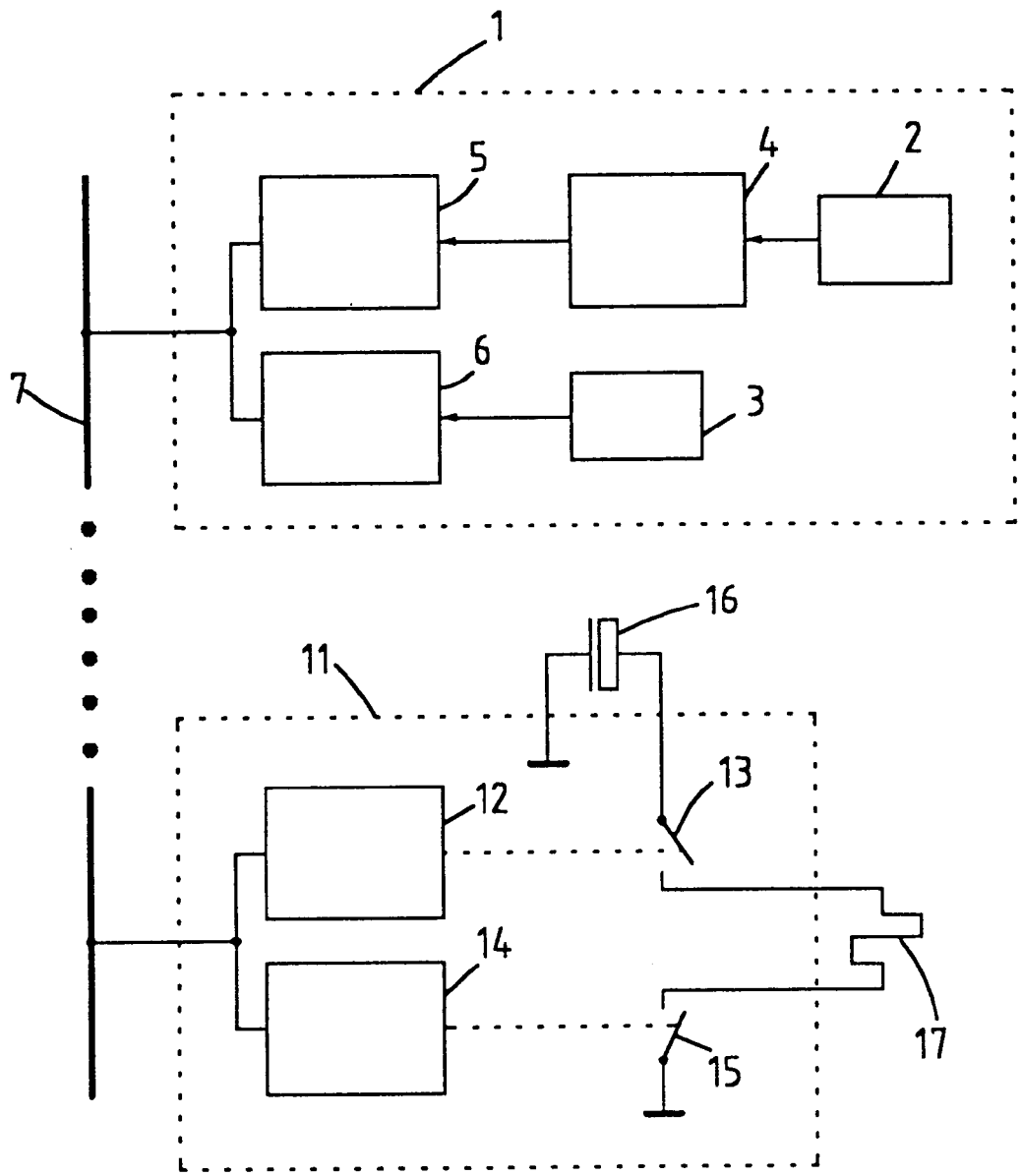

ARRANGEMENT FOR CONTROLLING PREDETERMINED FUNCTION VIA A DATA BUS

BACKGROUND OF THE INVENTION

The invention relates to an arrangement for controlling at least one predetermined function which can be transmitted by at least one transmission apparatus to at least one receiver apparatus via a serial data bus.

For the transmission of predetermined functions via a data bus in arrangements of this kind it is often desirable to trigger said functions with a high degree of reliability only if the appropriate message has indeed been transmitted via the data bus. In order to achieve this, DE-OS 196 15 293 utilizes a separation between normal messages, transmitted with a low amplitude, and critical, safety-relevant messages which are transmitted with a higher amplitude. However, at the receiver end the critical function is then triggered immediately by reception of the critical message of high amplitude. Thus, even though a separation is thus realized between non-critical and critical messages, no additional protection is offered against accidental triggering of the critical function at the receiver end, for example due to faults in the receiver.

SUMMARY OF THE INVENTION

It is an object of the invention to improve an arrangement of the kind set forth in such a manner that improved protection against unintentional triggering of the predetermined function is achieved in the receiver, said protection also being effective in the case of transmission errors or faults in the receiver.

This object is achieved according to the invention in that for the control of a predetermined function the transmission apparatus despatches an associated, predetermined data message on the serial data bus and adjusts a transmission parameter of the data bus to a predetermined value, and in that the receiver apparatus triggers the predetermined function only if the predetermined data message appears on the data bus with the predetermined transmission parameter.

When the transmitter is to trigger a safety-critical, predetermined message, the transmitter thus despatches on the one hand an appropriate predetermined data message on the serial data bus. In order to achieve additional safety during transmission as well as during reception, the transmitter additionally adjusts a predetermined transmission parameter of the data bus to a predetermined value. This parameter may concern, for example the speed of the message transmission, the signal amplitude, the amount of offset, or the like.

The predetermined function is triggered in the receiver apparatus only if both the predetermined data message appears on the data bus and the data message is transmitted with the predetermined transmission parameter. Thus, both conditions must be satisfied at the same time; otherwise the predetermined safety-critical function will not be triggered. This offers increased protection against unintentional activation of the predetermined function, because both conditions must be satisfied. The predetermined function is not yet triggered either, for example in the case of incorrect recognition of a data message as a predetermined data message. Unintentional triggering of the predetermined function by failure of a component assembly, for example also in the receiver, is also precluded.

An embodiment of the invention as disclosed in claim 2 is provided with two sensors which generate trigger signals independently of one another, which trigger signals independently activate the predetermined data message and the adjustment of the predetermined transmission parameter of the data bus to the predetermined value. An additional redundancy is thus also realized at the transmission end. An arrangement of this kind can be advantageously used, for example for the ignition of airbags in vehicles.

Further embodiments of the invention as disclosed in the claims 3 and 4 enable simple adjustment and measurement of the predetermined transmission parameter of the serial data bus. An arrangement for adjustment and measurement of a transmission speed on a serial data bus is known per se, for example from DE-OS 197 04 884. Such an arrangement can be advantageously used for the arrangement according to the invention.

The further embodiment of the invention which is defined in claim 6 offers a further advantageous possibility for adjustment of the transmission parameter. The redundancy is then achieved by adjustment of the transmission parameter of the serial data bus by selection of a different polarity of the pulses on the data bus.

The claims 8 and 9 disclose further advantageous embodiments of the invention in which simplicity of construction can be combined with the described protection against unintentional triggering of the predetermined function.

An embodiment of the invention will be described in detail hereinafter, by way of example, with reference to the drawing.

BRIEF DESCRIPTION OF THE DRAWINGS

The drawing shows a block diagram of an arrangement according to the invention which is intended to trigger ignition capsules of airbags in a vehicle or to control their ignition via a serial data bus.

DETAILED DESCRIPTION OF THE PREFERRED EMBODIMENTS

The sole Figure of the drawing shows a transmission apparatus 1 which includes a first crash sensor 2 and a second crash sensor 3. These sensors serve to detect deceleration values of a vehicle in which the transmission apparatus is incorporated in a manner not shown in the Figure. When the deceleration values exceed given values or the deceleration reaches a given characteristic, detection takes place by the sensors 2 and 3. The two sensors 2 and 3 then generate corresponding trigger signals.

The trigger signal of the first sensor 2 is applied to a microprocessor 4 which evaluates the signal and applies it to a transmitter 5. The transmitter 5 transmits a corresponding data message via a serial data bus 7.

The trigger signal of the second sensor 3 is applied to an arrangement 6 for controlling the data bus speed. The arrangement 6 is capable of adjusting of the speed at which the data is transmitted via the serial data bus 7. It is at least capable of adjusting two different speeds. The arrangement 6 for controlling the data bus speed is advantageously arranged so that normal data messages which do not belong to the predetermined, safety-critical data messages are transmitted on the data bus 7 at a lower speed.

The arrangement 6 for controlling the data bus transmission speed, however, increases the data speed on the serial data bus to a higher value when it receives a trigger signal from the second sensor 3. The sensor 2 then normally transmits a predetermined data message via the serial data bus 7 in order to trigger the predetermined function. Thus, when the arrangement 6 receives a trigger signal from the second sensor 3, it increases the data transmission speed on the data bus 7 and hence accelerates the predetermined data message currently being transmitted in order to trigger the predetermined safety-critical function.

It is thus achieved that normal data messages on the serial data bus 7 are transmitted at a lower data speed. However, when both sensors 2 and 3 are activated, on the one hand a predetermined data message is transmitted via the data bus 7 in order to trigger the predetermined safety-critical function. At the same time the arrangement 6 adjusts the transmission speed on the serial data bus 7 to the higher value.

In this manner a redundancy is achieved in that the predetermined, safety-critical function on the serial data bus is characterized not only by the relevant predetermined data message but also by the higher transmission speed. It is only when the two events occur simultaneously that the predetermined, safety-critical function should be triggered.

This is realized in a receiving apparatus 11 as shown in the Figure in that this apparatus includes on the one hand a data receiving apparatus 12 which evaluates data messages occurring on the serial data bus 7 and on the other hand an arrangement 14 for measuring the data bus transmission speed which continuously measures the transmission speed on the data bus 7. The predetermined, safety-critical function should be triggered only if the data receiving apparatus 12 detects the predetermined data message on the data bus 7 while at the same time the arrangement 14 detects a data transmission at the higher data speed on the data bus 7.

The foregoing is achieved in the embodiment shown in the Figure in that upon detection of the predetermined data message on the data bus 7 the receiving apparatus 12 closes a switch while the arrangement 14 closes a switch 15 upon detection of the higher transmission speed on the serial data bus 7.

It is only when both switches 13 and 15 are closed that an energy source 16 on the one hand and a reference potential of the arrangement on the other hand are applied to an ignition capsule 17 of an airbag which is diagrammatically indicated in the Figure. Thus, the airbag is ignited by means of the ignition capsule 17 only if the two switches 13 and 15 are simultaneously closed.

This case, however, can occur exclusively if the data receiver 12 as well as the arrangement 14 have encountered the conditions corresponding to triggering of the predetermined safety-relevant function, so on the one hand the predetermined data message on the data bus and on the other hand the higher transmission speed on the serial data bus 7.

For example, in the event of a transmission error, a fault in the transmission apparatus 1 or a fault in the receiving apparatus 11, each time only one of the two conditions is satisfied so that only one of the switches 13 or 15 is closed and the undesirable triggering of the ignition capsule 17 is prevented.

Overall, complete redundancy has thus been achieved throughout the transmission on the data bus 7. Both conditions must be simultaneously satisfied in order to trigger the predetermined function. This offers protection against unintentional triggering of the predetermined function. The protection covers faults in the transmitter 1 as well as in the receiver 11. Transmission errors on the data bus 7 cannot activate the predetermined, safety-critical function either, because such errors normally will not lead to the simultaneous meeting of both conditions governing the triggering of the predetermined function.

Evidently, the arrangement according to the invention is not only suitable for the purpose of igniting airbags in a vehicle; it can be used whenever functions are to be transmitted which should be protected against unintentional triggering. In that case other switching elements other than the sensors 2,3 and the ignition capsule 17 should be provided; such switching elements have to be selected in conformity with the function to be triggered.

What is claimed is:

1. An arrangement for controlling at least one predetermined function which can be transmitted by at least one transmission apparatus (1) to at least one receiver apparatus (11) via a serial data bus (7), characterized in that for the control of a predetermined function the transmission apparatus (1) dispatches an associated, predetermined data message on the serial data bus (7) and adjusts a transmission parameter of the data bus to a predetermined value, and that the receiver apparatus (11) triggers the predetermined function only if the predetermined data message appears on the data bus (7) with the predetermined transmission parameter.

2. An arrangement as claimed in claim 1, wherein there are provided two sensors (2,3) for triggering a predetermined function, that for the control of the predetermined function the sensors (2,3) generate trigger signals subject to given conditions, that a trigger signal of a first one (2) of the sensors (2,3) is despatched on the serial data bus (7) as a predetermined data message, and that a trigger signal of a second one (3) of the sensors (2,3) adjusts a predetermined transmission parameter of the data bus (7) to a predetermined value.

3. An arrangement claimed in claim 1 or 2, wherein a predetermined transmission speed on the data bus (7) acts as the predetermined transmission parameter.

4. An arrangement as claimed in claim 3, wherein the predetermined transmission speed on the data bus (7) is adjusted exclusively in the presence of a trigger signal from the second sensor (3).

5. An arrangement as claimed in claim 1, wherein a fixed signal amplitude on the data bus (7) acts as the predetermined transmission parameter.

6. An arrangement as claimed in claim 1, wherein a bipolar alternating voltage is transmitted via the data bus (7), that the pulses of one polarity of the alternating voltage are used for the transmission of energy and are adjusted to a given value in order to trigger a predetermined function, and that the pulses of the other polarity are used for the data transmission and constitute the associated, predetermined data message for the triggering of a predetermined function.

7. An arrangement as claimed in claim 2, wherein the two sensors (2,3) are crash sensors of a vehicle, and that the predetermined function is the triggering of ignition capsules (17) of airbags of a vehicle.

8. An arrangement as claimed in claim 2, wherein the arrangement includes a transmission apparatus (1) whereto the sensors (2,3) apply the trigger signals, if any, and also includes a transmitter (5) which converts a trigger signal from the first sensor (2) into the predetermined data message, and also includes an arrangement (6) which serves to control the data bus transmission speed and adjusts the transmission speed of the data bus to a predetermined value in response to the appearance of a trigger signal from the second sensor (3).

9. An arrangement as claimed in claim 2, wherein the arrangement includes a receiving apparatus (11) which evaluates the data bus (7) and triggers the predetermined function only if a data receiver (12) which is included in the receiving apparatus (11) receives the predetermined data message from the data bus (7) and if an arrangement (14) which is included in the receiver (11) in order to measure the data bus transmission speed detects at the same time a predetermined transmission speed on the data bus (7).

10. A vehicle provided with an arrangement as claimed in claim 1.

* * * * *